US005795425A

United States Patent [19]

Brault et al.

[11] Patent Number: 5,795,425

[45] Date of Patent: Aug. 18, 1998

[54] INK JET IMAGING PROCESS AND RECORDING ELEMENT FOR USE THEREIN

[75] Inventors: Donald Armand Brault, Granby; Douglas Allan Cahill, Belchertown; Richard Scott Himmelwright, Wilbraham; Dene Harvey Taylor, Holyoke, all of Mass.

[73] Assignee: Rexam Graphics Incorporated, South Hadley, Mass.

[21] Appl. No.: 115,561

[22] Filed: Sep. 3, 1993

[51] Int. Cl.$^6$ .................... B32B 31/00

[52] U.S. Cl. .................... 156/235; 156/240; 156/277; 428/40.1

[58] Field of Search .................... 158/230, 234, 158/235, 239, 240, 241; 156/277; 430/126; 101/492; 428/40, 266, 327

[56] References Cited

U.S. PATENT DOCUMENTS

| | | | |
|---|---|---|---|
| 3,043,732 | 7/1962 | Shepherd | 156/230 |
| 3,376,182 | 4/1968 | Borell | 156/253 X |
| 3,519,456 | 7/1970 | Reed | 158/240 X |
| 3,554,835 | 1/1971 | Morgan | 156/235 X |
| 3,607,526 | 9/1971 | Biegen | 156/235 X |
| 4,027,345 | 6/1977 | Fujisawa | 156/240 X |
| 4,165,399 | 8/1979 | Germonprez | 156/277 X |
| 4,171,398 | 10/1979 | Hunt | 156/243 X |
| 4,235,657 | 11/1980 | Greenman | 156/234 |
| 4,318,953 | 3/1982 | Smith | 428/200 X |
| 4,515,849 | 5/1985 | Keino | 156/230 X |
| 4,555,436 | 11/1985 | Guertsen | 156/241 X |
| 4,666,757 | 5/1987 | Helinski | 428/204 |
| 4,686,260 | 8/1987 | Lindemann | 524/458 X |
| 4,721,635 | 1/1988 | Hellinski | 156/277 X |
| 4,732,786 | 3/1988 | Patterson et al. | 427/261 |
| 4,775,594 | 10/1988 | Desjarlais | 428/421 |
| 4,780,348 | 10/1988 | Yamamoto et al. | 428/43 |
| 4,900,597 | 2/1990 | Kurtin | 156/241 X |
| 4,927,709 | 5/1990 | Parker | 428/352 |
| 4,983,436 | 1/1991 | Bailey | 428/40 X |
| 4,983,487 | 1/1991 | Gilreath | 430/126 X |
| 5,006,502 | 4/1991 | Fujimura et al. | 503/227 |
| 5,120,383 | 6/1992 | Takei | 156/277 X |
| 5,126,195 | 6/1992 | Light | 428/327 |
| 5,160,778 | 11/1992 | Hashimoto | 428/195 |
| 5,198,306 | 3/1993 | Kruse | 428/481 |
| 5,217,773 | 6/1993 | Yoshida | 428/40 |
| 5,217,793 | 6/1993 | Yamane | 428/195 X |
| 5,225,260 | 7/1993 | McNaul et al. | 428/40 |
| 5,310,436 | 5/1994 | Pricone | 156/277 X |

FOREIGN PATENT DOCUMENTS

| | | | |
|---|---|---|---|
| 0546650 | 6/1993 | European Pat. Off. | |
| 3616081 | 11/1987 | Germany | 156/241 |
| 3717107 | 11/1987 | Germany | |
| 0026915 | 7/1977 | Japan | 156/241 |
| 0116406 | 9/1979 | Japan | 156/277 |
| 0087397 | 5/1982 | Japan | 156/238 |
| 2210828 | 6/1989 | United Kingdom | 156/239 |

OTHER PUBLICATIONS

Pp. 379–384 of W.E. Haas' Chapter 13, "Non–Impact Printing Technologies"; Imaging Processes and Materials—Neblette's Eighth Edition; Edited by J. Sturge, V. Walworth, A. Shepp; Van Nostrand Reinhold, New York; 1989.

*Primary Examiner*—James Engel

*Attorney, Agent, or Firm*—Ratner & Prestia

[57] ABSTRACT

A novel two step process is disclosed for the manufacture of protected, distortion-free, full-color ink jet images for use on large format posters, billboards and the like. A novel ink receptive element, which is used in the process, comprises a temporary carrier layer; a protective layer; and an adhesive ink receptive layer. The novel imaging process comprises: A) depositing an ink image layer on the surface of the ink receptive element, so that the ink image layer is adhered to the surface of the adhesive, ink receptive layer; B) pressure laminating the receptor substrate to the ink image layer to form a laminated image element; and C) removing the temporary carrier layer from the protective layer of the laminated image element to form a protected imaged substrate. The protective layer then serves to protect the ink image from abrasion and environmental contaminants.

40 Claims, 2 Drawing Sheets

INK JET IMAGING PROCESS AND RECORDING ELEMENT FOR USE THEREIN

BACKGROUND OF THE INVENTION

1. Field of the Invention

This invention relates to ink jet printing processes for making images, and particularly, color images. More particularly, this invention relates to ink jet printing processes and the elements used therein for the production and protection of large size, full color images.

2. Description of Related Art

The use of ink jet printing processes in the manufacture of multicolor images is well known in the art. In such processes, ink droplets are emitted from a nozzle and deposited on substrates, such as paper, to form an image. In order to obtain good quality images, rapid absorption of the ink into the substrate is required, but at the same time the ink colorant must be retained at or near the surface of the substrate with lateral ink migration limited to the resolution of the printer. Ink jet printing and its use in making full color images is reviewed in general by Werner E. Haas in "Non-Impact Printing Technologies": Chapter 13, pages 379–384, of IMAGING PROCESSES AND MATERIALS - NEBLETTE'S EIGHTH EDITION, Edited by John Sturge, Vivian Walworth & Allan Shepp, (1989) Van Nostrand Reinhold, New York. In this review, Haas reviews the methods of ink jet printing and briefly addresses criteria needed in inks and papers.

To achieve high quality images in ink jet printing, the substrate, e.g., paper, is coated with a formulation to meet the requirements discussed supra. Although paper stock is extensively used as the substrate for ink jet printing, many other materials are used including plastic films and sheets, fabrics, metals, woods, glass, and the like. When transparencies are to be produced, typically a coated transparent plastic film or sheet is used as the substrate. Since aqueous based inks are the common type of ink used in ink jet printing processes, substrate coating formulations typically are hydrophilic and contain appropriate absorptive materials. Such coated substrates may be illustrated by Patterson et al., U.S. Pat. No. 4,732,786; Desjarlais, U.S. Pat. No. 4,775,594; Light, U.S. Pat. No. 5,126,195; and Kruse, U.S. Pat. No. 5,198,306. Patterson et al. disclose coated paper and film as ink jet printing substrates in which the coating comprises a pigment, a binder, an insolubilized hydrophilic polymer and a polymer .of a polyvalent cation. Desjarlais discloses an ink jet transparency with wetting properties which result in even surface distribution of ink on the transparency. The transparency comprises a transparent resinous support and a clear coating thereon containing a water soluble resin, a water insoluble resin, a fluorosurfactant, and non-volatile organic acid including glycolic, methoxy acetic, dibasic carboxylic, or tribasic carboxylic acid. Light discloses transparent image-recording elements that contain ink-receptive layers that can be imaged by liquid ink dots. The ink receptive layers contain a vinyl pyrrolidone, particles of a polyester, a polymeric alkylene oxide, a polyvinyl alcohol, nonylphenoxypolyglycidol and inert particles. Kruse discloses a recording transparency and its method of preparation from water solution. The transparency disclosed comprises a transparent substrate and a coating of a synthetic transparent cellulosic polymer and a surfactant composition comprising nonionic detergent, anionic detergent and complexing agent.

A method of preparing a color printed record using hot-melt ink jet technology is disclosed by Helinski, U.S. Pat. No. 4,666,757. A printed record in color is disclosed which comprises a transparent sheet on which is jet-printed subtractive color hot-melt inks. The inked surface of the transparent sheet is adhered to the surface of an opaque backing sheet, usually white in color. The transparent sheet is identified as a transparent flexible material such as a plastic film material marketed under the trademark Mylar. The opaque backing sheet is identified as a sheet of plain white uncoated paper. It is further disclosed that the two sheets may be held together by suitable affixing means such as a transparent adhesive coating preapplied to the surface of the opaque sheet.

An image protective film is disclosed by Yoshida, U.S. Pat. No. 5,217,773. An image protective film and its method of use is disclosed in which the film comprises a base layer, a release layer formed of a resin having no compatibility with the base layer and an adhesive layer formed of a thermoadhesive resin. The film is superposed on an image surface of an object article such that the adhesive layer comes in contact with the image surface and thereafter heated. The base layer is separated from the object article and the adhesive layer and the release layer remain on the object article to form a protective layer. A variety of images are disclosed including those formed by ink jet recording systems.

Current ink jet printing processes, inks and substrates are capable of producing high quality four color images in sizes ranging from office copy up to sizes useful for posters, displays and billboards. However, application of ink jet printing has been limited largely to such uses as office copy and the like where environmental and abrasion damage to the finished ink image is unlikely. When used as posters, displays and particularly billboards, the water sensitive ink jet image and underlying substrate must be protected from rain, sunlight, and other environmental contaminants and should likewise be protected from abrasion and graffiti to provide adequate useful life to the image displayed. Although advances have been made in providing protection for color ink jet images on substrates which are flat or planar, there is an industry need for a method for applying protected, distortion-free, ink jet images to objects having non-planar topography. There also continues to be an industry need for a simplified process to provide protected, distortion-free, full-color ink jet images, particularly, for use on large format posters, billboards and the like.

SUMMARY OF THE INVENTION

These needs are met by the ink jet imaging process of this invention which is a process for preparing a protected ink image comprising A) imagewise depositing one or more ink images on an ink receptor, the ink receptor comprising 1) a temporary carrier layer;

2) an image transparent, protective layer; and 3) an image transparent, adhesive, ink receptive layer permanently adhered to the protective layer; wherein, the one or more ink images are deposited on the image transparent, adhesive, ink receptive layer to form an ink imaged layer of an imaged receptor;

B) applying to the ink imaged layer of the imaged receptor a substrate; wherein, the adhesive of the image transparent, adhesive, ink receptive layer is activated whereby the substrate is adhered to the ink imaged layer of the imaged receptor to form an imaged laminate; and C) removing the temporary carrier layer from the image transparent, protective layer of the imaged laminate.

In an added embodiment of this invention, the substrate further comprises c) a adhesive layer adhered to a surface of the substrate; and optionally, d) a removable cover sheet temporarily adhered to the adhesive layer;

wherein, the process further comprises; either before or after step (C),

D) removing the removable cover sheet, if present, from the adhesive layer and adhering the adhesive layer of the imaged laminate to a second substrate to form a mounted, imaged laminate. A further embodiment of this invention is an ink recording element comprising:

1) a temporary carrier layer;

2) an image transparent, protective layer; and 3) an image transparent, adhesive, ink receptive layer permanently adhered to the protective layer; wherein, the image transparent, adhesive, ink receptive layer is receptive to aqueous ink jet inks and comprises a hydrophilic resin material and an adhesive material.

BRIEF DESCRIPTION OF THE DRAWINGS

The invention can be more fully understood from the following description thereof in connection with the accompanying drawings described as follows.

DETAILED DESCRIPTION OF THE INVENTION

Figure 1:
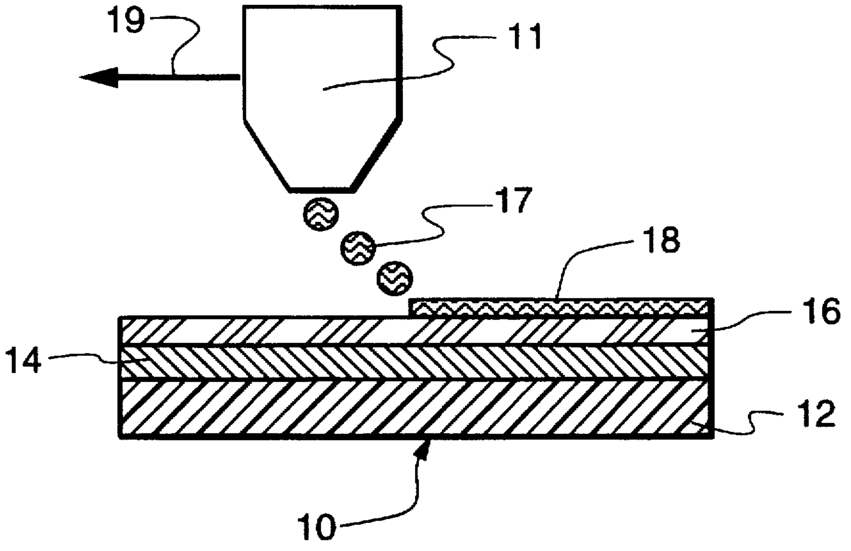
FIG. 1 is a cross section view illustrating details of the ink deposition step of the process of this invention and the ink receptive element used therein.

The present invention relates to a novel process for forming a protected ink jet image on a substrate using an ink receptor element and a substrate. The ink receptor element comprises, a temporary carrier layer, an image transparent, protective layer, and an image transparent, adhesive, ink receptive layer which is permanently adhered to the protective layer. The novel ink jet imaging process comprises the steps: A) imagewise depositing one or more ink images on the ink receptor element, wherein, the ink image(s) are deposited on the image transparent, adhesive, ink receptive layer to form an ink imaged layer of an imaged receptor; B) applying to the ink imaged layer of the imaged receptor a substrate wherein, the adhesive of the image transparent, adhesive, ink receptive layer is activated whereby the substrate is permanently adhered to the ink imaged layer of the imaged receptor to form an imaged laminate; and C) removing the temporary carrier layer from the image transparent, protective layer of the imaged laminate. Optionally, the substrate further comprises; a second adhesive layer adhered to a surface of the substrate; and optionally, a removable cover sheet temporarily adhered to the second adhesive layer. When the substrate further comprises a adhesive layer adhered to the surface of the substrate; and optionally, the removable cover sheet temporarily adhered to the adhesive layer; the process of this invention further comprises, either before or after step (C), (D) removing the removable cover sheet, if present, from the adhesive layer and adhering the adhesive layer of the imaged laminate to a second substrate to form a mounted, imaged laminate. In the process of this invention, the adhesive surprisingly adheres the protected image permanently, and without distortion, to the substrate even though the image layer is between the adhesive and the substrate.

The ink jet imaging process of this invention will now be described by reference to the accompanying drawings. Throughout the following description, similar reference characters refer to similar elements in all figures of the drawings.

The first process step (A) comprises imagewise depositing one or more ink images on an ink receptor element. Referring to FIG. 1, an ink jet device (11) traversing in a direction (19) across an ink receptor element, imagewise deposits ink droplets (17) on an adhesive, ink receptive layer (16) to form an imaged layer (18). The imaged receptor element (10) which is formed comprises; a temporary carrier layer (12), an image transparent, protective layer (14), an image transparent, adhesive, ink receptive layer (16), and an ink imaged layer (18).

The ink jet device (11) which is used to print the ink imaged layer (18) may be any of the conventional ink jet printers used to print a single color or a full color image. Conventional ink jet printing methods and devices are disclosed by Werner E. Haas in "Non-Impact Printing Technologies": Chapter 13, pages 379–384, of IMAGING PROCESSES AND MATERIALS - NEBLETTE'S EIGHTH EDITION, Edited by John Sturge, Vivian Walworth & Allan Shepp, (1989) Van Nostrand Reinhold, New York, which is incorporated herein by reference. Additional ink jet devices include Hewlett Packard Desk Jet 500 and 500C printers; IBM Lexmark® ink jet printers; Cannon Bubblejet® printers; NCAD Computer Corporation Novajet® printers; and the like. In the practice of this invention, either a one color ink image, e.g., black, is deposited; or several colors are deposited either in sequence or simultaneously, to form an ink imaged layer (18), e.g., a four color subtractive color image consisting of yellow, magenta, cyan and black images in register. Unless the printed ink imaged layer (18) is to be used in the manufacture of a transparency, the ink image typically is printed on the adhesive, ink receptive layer (16) as a reverse or mirror image so that the completed protected ink image will possess correct orientation when applied to an opaque substrate.

The inks used in the ink imaging process of this invention are well known for this purpose. The ink compositions used, typically are liquid compositions comprising a solvent or carrier liquid, dyes or pigments, humectant, organic solvents, detergents, thickeners, preservatives, and the like. The solvent or carrier liquid typically is water, although ink in which organic materials such as polyhydric alcohols as the predominant solvent or carrier also are used. The dyes used in such compositions are typically water-soluble direct or acid type dyes. Such liquid ink compositions have been extensively described in the prior art, e.g., such as disclosed by P. Gender in "Materials Aspects For High Quality Color Thermal Ink Jet Printing" IS&T's 46th Annual Conference (1993), pages 175–177, which is incorporated herein by reference.

Figure 2:
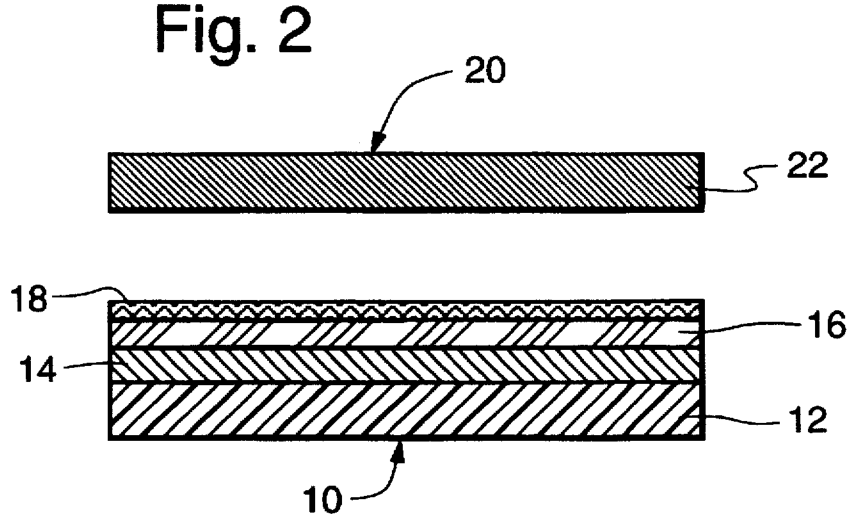
FIG. 2 is a cross section view illustrating details of the imaged ink receptive element and the substrate.

Referring to FIG. 2, details of the imaged receptor element (10) and the substrate (22) are illustrated. In preparation for the second step of the process of this invention, the imaged receptor element (10) is oriented to a substrate element (20), comprising a substrate (22), so that a surface of the substrate (22) faces the surface of the ink imaged layer (18).

The temporary carrier layer (12) of the imaged receptor element (10) functions as a temporary support to the superposed layers during the process steps of this invention and may be any web or sheet material possessing suitable flexibility, dimensional stability and adherence properties to the protective layer (14). Typically, the web or sheet material is a flexible polymeric film, e.g., such as polyethylene terephthalate film and the like, or a foraminous material, e.g., such as a paper sheet and the like. The web or sheet may also be surface treated or coated with a material to enhance desired release characteristics, e.g., such as treatment with a silicone release agent and the like.

The image transparent, protective layer (14) of the imaged receptor element (10) is a polymeric film material which is resistant to scratching, abrasions and the like, and to environmental components and contaminants. The protective layer (14) is permanently adhered to the image transparent, adhesive, ink receptive layer (16) while being only temporarily adhered to the temporary carrier layer (12). The protective layer (14) is visually transparent in at least one region within the visible spectral region and typically is transparent throughout the visible spectral region. Polymeric materials which are useful in making this layer include polyvinyl chloride; polyvinylidene chloride; fluorinated polymers and copolymers; polyvinyl butyral; cellulose acetate propionate; cellulose acetate butyrate; polyesters; acrylics; fluorinated polymers; polyurethanes; styrene copolymers, e.g., such as styrene acrylonitrile; and combinations thereof. This layer may contain components which strongly absorb ultraviolet radiation thereby reducing damage to underlying images by ambient ultraviolet light, e.g., such as 2-hydroxybenzophenones; oxalanilides; aryl esters and the like; hindered amine light stabilizers, such as bis(2,2,6,6-tetramethyl-4-piperidinyl) sebacate and the like; and combinations thereof. This layer may also contain components which provide protection from biological attack, such as, fungicides and bactericides, and the like. The protective layer may be provided with a matt surface. This matt surface can be obtained by including in the layer particles sufficiently large to give surface irregularities to the layer, or may be imparted or embossed by the surface characteristics of the temporary carrier layer (12). Particles of average diameter in the range of about 1 μm to about 15 μm are suitable. The protective layer also may be provided with a graffiti-proof surface, typically, a perfluorinated polymer surface. The protective layer (14) typically has a thickness in the range of about 0.5 μm to about 10 μm and preferably in the range of about 1 μm to about 4 μm. Such layers typically will withstand scribing with the point of a 4H pencil without breakthrough.

The image transparent, adhesive, ink receptive layer (16) of the receptor element (10), is permanently adhered to the image transparent, protective layer (14), and provides a dual function of ink receptivity as well as an adhesive to the ink receptor element (10). The material of the image transparent, adhesive, ink receptive layer (16) is a hydrophilic, aqueous ink sorptive, coating material as well as an adhesive which, when activated, functions to adhere the protected image to the substrate (22). The adhesive, ink receptive layer (16) may be a blend of the necessary materials in a single layer, or it may be a composite of two or more individual layers wherein one layer would contain the major character of the ink receptive material and the other would contain the major character of an adhesive material and in part a shared character of the ink receptive material. The adhesive, ink receptive layer (16) is visually transparent in at least one region within the visible spectral region and typically is transparent throughout the visible spectral region. The visible spectral region of the adhesive, ink receptive layer (16) typically is matched to that of the protective layer (14). The image transparent, adhesive, ink receptive layer (16) may be prepared from a wide variety of hydrophilic, aqueous ink sorptive, coating materials. In current industry practice, a typical ink receptive layer is formulated to provide suitable ink receptivity tuned for a particular ink jet device (11) and related ink (17) used therein. In the practice of this invention the ink receptive layer (16) must also have adhesive characteristics. Suitable formulations for the ink receptive material are disclosed in Desjarlais, U.S. Pat. No. 4,775,594; Light, U.S. Pat. No. 5,126,195; and Kruse, U.S. Pat. No. 5,198,306, each of which is incorporated herein by reference. The ink receptive layer (16) typically is comprised of at least one hydrophilic polymer or resin which also may be water soluble. Suitable hydrophilic polymers or resins include polyvinyl alcohols, including substituted polyvinyl alcohols; polyvinyl pyrrolidones, including substituted polyvinyl pyrrolidones; vinyl pyrrolidone/vinyl acetate copolymer; vinyl acetate/acrylic copolymers; acrylic acid polymers and copolymers; acrylamide polymers and copolymers; cellulosic polymers and copolymers; styrene copolymers of allyl alcohol, acrylic acid, malaeic acid, esters or anhydride, and the like; alkylene oxide polymers and copolymers; gelatins and modified gelatins; polysaccharides; and the like. Preferred hydrophilic polymers include polyvinyl pyrrolidone; substituted polyvinyl pyrrolidone; polyvinyl alcohol; substituted polyvinyl alcohol; vinyl pyrrolidone/vinyl acetate copolymer; vinyl acetate/acrylic copolymer; polyacrylic acid; polyacrylamides; hydroxyethylcellulose; carboxyethylcellulose; gelatin; and polysaccharides. The ink receptive layer (16) may also contain other water insoluble or hydrophobic polymers or resins to impart a suitable degree of hydrophilicity and/or other desirable physical and chemical characteristics.

Suitable polymers or resins of this class include polymers and copolymers of styrene, acrylics, urethanes, and the like. Preferred polymers and resins of this type include a styrenated acrylic copolymer; styrene/allyl alcohol copolymer; nitrocellulose; carboxylated resin; polyester resin; polyurethane resin; polyketone resin; polyvinyl butyral resin; or mixtures thereof. In addition to the polymeric or resin components, the ink receptive layer (16.) typically contains other added components such as a dye mordant, a surfactant, particulate materials, a colorant, an ultraviolet absorbing material, an organic acid, an optical brightener, and the like. Dye mordants which may be used to fix the printed ink to the ink receptive layer (16) may be any conventional dye mordant, e.g, such as polymeric quaternary ammonium salts, polyvinyl pyrrolidone, and the like. Surfactants which are used as coating aids for the ink receptive layer (16) may be any nonionic, anionic, or cationic surfactant. Particularly useful, are fluorosurfactants, alkylphenoxypolyglycidols, and the like. The ink receptive layer may also contain particulate material. Such materials are believed to aid in enhancing the smoothness characteristics of the ink receptive surface, particularly after it has been printed upon without adversely affecting the transparent characteristics of the element. Suitable particulate material includes inorganic particles such as silicas, chalk, calcium carbonate, magnesium carbonate, kaolin, calcined clay, pyrophylite, bentonite, zeolite, talc, synthetic aluminum and calcium silicates, diatomatious earth, anhydrous silicic acid powder, aluminum hydroxide, barite, barium sulfate, gypsum, calcium sulfate, and the like; and organic particles such as polymeric beads including beads of polymethylmethacrylate, copoly(methylmethacrylate/divinylbenzene), polystyrene, copoly(vinyltoluene/t-butylstyrene/methacrylic acid), polyethylene, and the like. The composition and particle size of the particles are selected so as not to impair the transparent nature of the ink receptive layer (16). The ink receptive layer (16) may also contain a colorant, e.g., a dye or pigment, provided the layer is visually transparent in at least one region within the visible spectral region and typically is transparent throughout the visible spectral region. This layer may contain components which strongly absorb ultraviolet radiation thereby reducing damage to underlying images by ambient ultraviolet light, e.g., such as 2-hydroxybenzophenones; oxalanilides; aryl esters and the like; hindered amine light stabilizers, such as bis(2,2,6,6-tetramethyl-4-piperidinyl) sebacate and the like; and combinations thereof. Organic acids which are used to adjust the pH and hydrophilicity in the ink receptive layer (16) typically are non-volatile organic acids such as a alkoxy acetic acid, a glycolic acid, a dibasic carboxylic acid and half esters thereof, a tribasic carboxylic acid and partial esters thereof, aromatic sulfonic acids, and mixtures thereof. Preferred organic acids include glycolic acid, methoxy acetic acid, citric acid, malonic acid, tartaric acid, malic acid, maleic acid, fumaric acid, itaconic acid, succinic acid, oxalic acid, 5-sulfo-salicylic acid, p-toluenesulphonic acid, and mixtures thereof. Optical brighteners which may be used to enhance the visual appearance of the imaged layer may be any conventional, compatible optical brightener, e.g., such as optical brighteners marketed by Ciba-Geigy under the trademark of Tinopal®.

The adhesive material of the image transparent, adhesive, ink receptive layer (16), functions to permanently adhere the ink imaged layer (18), the ink receptive layer (16) and the protective layer (14) of the imaged receptor element (10), to the substrate (20) during the process of this invention. The adhesive material may be chosen from a variety of conventional adhesive materials, e.g., such as thermally activated, pressure sensitive, photo activated, or contact adhesives and the like, provided it is compatible with the components of the ink receptive material and that it contributes, at least in part, to ink receptivity. The term "compatible" is intended to mean that the adhesive material may be dispersed within the image transparent, adhesive, ink receptive layer (16) without substantially altering the image transparency or ink receptivity of the layer. Typically, the adhesive material will be a thermally activated, hydrophilic, adhesive material comprised of thermoplastic polyurethanes; polycaprolactone; acrylic copolymers; and combinations thereof. Representative thermally activated adhesive materials include Rovace® HP-2931 vinyl acetate/acrylic copolymer (a product of Rohm & Haas Company); Morthane® CA-116 urethane resin (a product of Morton International); Tone® Polymer P767E biodegradable plastic resin (a product of Union Carbide); Elvax® 240 vinyl resin (a product of Dupont Chemicals); and the like. In the instance when the adhesive material is blended into the ink receptive material to form a single layer, preferred adhesive materials are vinyl acetate/acrylic copolymers. In the instance when the adhesive material is coated as a separate layer onto the ink receptive layer, preferred adhesive materials are polycaprolactones. When the adhesive material is coated as a separate layer, the layer typically has a thickness in the range of about 0.5 μm to about 10 μm.

The substrate (22) typically functions as the final support for the protected ink imaged layer (18) formed during the process steps of this invention. The substrate (22) may be any surface upon which an ink jet image is desired. Typically, it is a web or sheet material possessing dimensional stability and adherence properties through the adhesive of the ink receptive layer (16) to the ink imaged layer (18) of the imaged receptor element (10). The web or sheet material may be a flexible polymeric film, e.g., such as polyethylene terephthalate film and the like; a foraminous material, e.g., such as a paper sheet, textile fabrics, and the like; metal films or webs, e.g., such as aluminum, steel, tin-plate, and the like; or any composites or laminates thereof. The substrate (22) may be a rigid or semi-rigid sheeting or plate, e.g., such as sheeting or plates of metal, glass, ceramic, plastic, cardboard, or any composites or laminates thereof. The substrate (22) may vary in size from that of a photographic print, e.g., having an area of about 30 $cm^2$ or less, to that of vehicle signage or billboards, e.g., having an area of about 70 $m^2$ or greater. Since the thin protective (14) and ink receptive (16) layers are highly compliant, the substrate (22) also may vary in shape and surface topography, e.g., spherical, embossed, etc. When a transparency is to be produced by the process of this invention, the substrate (22) is visually transparent in at least one region within the visible spectral region and typically is transparent throughout the visible spectral region. This layer may contain components which strongly absorb ultraviolet radiation thereby reducing damage to underlying images by ambient ultraviolet light, e.g., such as 2-hydroxybenzophenones; oxalanilides; aryl esters and the like; hindered amine light stabilizers, such as bis(2,2,6,6-tetramethyl-4-piperidinyl) sebacate and the like; and combinations thereof. The web or sheet may also be surface treated or coated with a material to enhance desired surface characteristics, e.g. sub-coatings, electric discharge treatment, and the like. By careful selection of the adhesive system, the imaged receptor element (10) can be applied to most solids or foraminous materials, e.g., adhesive backed vinyl, cling vinyl, and polyethylene terephthlate films; steel, glass, ceramic, and wood sheets and objects. The substrate element (20) may further comprise an adhesive layer adhered to a surface of the substrate (22) not already adhered to the ink imaged layer (18), e.g., the reverse side; and optionally a removable cover sheet may be temporarily adhered to the adhesive layer. The adhesive material of the adhesive layer may be any contact, thermal or pressure sensitive adhesive, such as described supra, and may be an integral part of the substrate element (20) or it may be applied just prior to a mounting step. Typically, a removable cover sheet is temporarily adhered to the adhesive surface of the substrate element (20) to protect against damage during storage or preliminary handling. The removable cover sheet may be any conventional release cover sheet.

The ink imaging process of this invention comprises three process steps of which the initial process step (A) of producing an imaged receptor element (10) has been described, supra, by reference to FIG. 1. The remaining steps of the process may be described by reference to FIGS. 3.

Figure 3A:
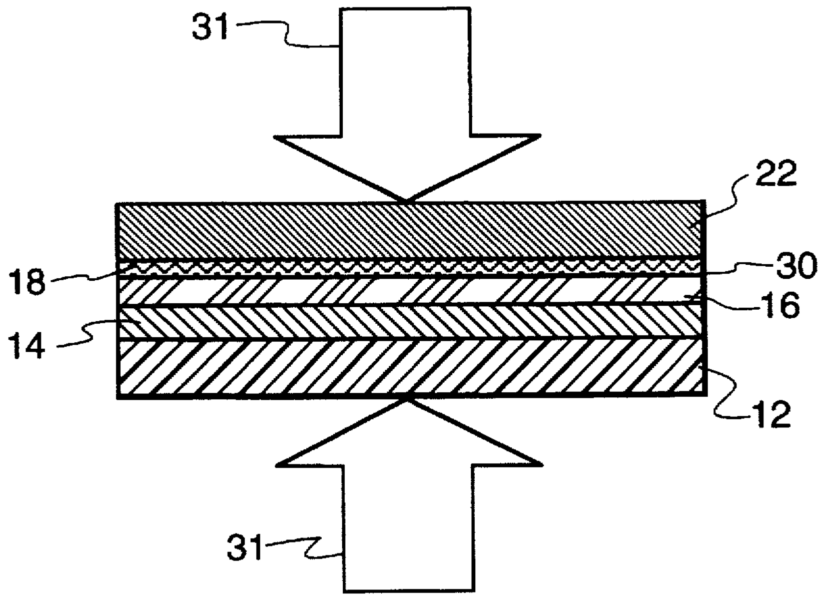
FIGS. 3*a* and 3*b* are cross section views illustrating subsequent process steps of this invention.

The second process step (B) comprises applying to the ink imaged layer (18) of the imaged receptor element (10), the surface of the substrate (22). Referring to FIG. 3a, the substrate (22) is contacted and adhered (typically permanently) to the ink imaged layer (18) using an applied pressure (31) to the surfaces of the temporary carrier layer (12) and the substrate (22) to activate the adhesive and form an imaged laminate (30). When only a pressure sensitive adhesive is used, the applied pressure (31) must be sufficient to activate the adhesive to form a permanent bond between the layers. The substrate (22) typically is applied to the ink imaged layer (18) under an applied pressure (31) of atmospheric pressure or greater. The applied pressure (31) may be about 0.07 $kg/cm^2$ (1 p.s.i.) to about 7 $kg/cm^2$ (100 p.s.i.) or greater. The term "applied pressure" is intended to mean the absolute pressure which is applied to a unit area of the surface as conventionally derived from the geometry of the pressure means, e.g., the geometry of the laminating nip, in combination with a measurement means, e.g., a calibrated gauge pressure. Suitable means that may be used to apply pressure include platen presses; counterpoised, double roll, laminating devices; vacuum laminating devices; scanning, single roll, laminating devices; hand-held, rollers and squeegees; and the like. Typically roll laminating devices are preferred since they readily minimize air entrapment between the substrate (22) and the ink imaged layer (18) during the application process step. Vacuum may be applied with such devices to further eliminate air entrapment. Typically, the adhesive is a thermally activated adhesive. In this instance, heat is typically applied to the imaged receptor element (10) prior to and/or concurrently with the application of the applied pressure (31). While the temperature used to activate the adhesive depends on the nature of the material, the substrate (22) is applied to the ink imaged layer (18) at a temperature of about 80° C. or greater and preferably about 100° C. or greater. Typical application temperatures range from about 100° C. to about 200° C. Typically, temperature is measured on the surface of the heated roll or platen by means of temperature sensitive tape. Thus the imaged receptor element (10) may be heated prior to its application by radiant or contact heaters and then applied while hot to the substrate (22). Alternatively the pressure means itself may also function as a heater, e.g., such as a hot roll laminator, or both prior and concurrent heating may be used in combination. The adhesive may also be a photo-activated adhesive. In this instance, the adhesive typically is irradiated with actinic radiation either concurrently with or subsequent to the application of the applied pressure (31). In this instance, the substrate (22), the protective layer (14) and/or any intervening layer should be sufficiently transparent to the actinic radiation which activates the photo adhesive. When the adhesive is thermally or photo activated, the applied pressure (31) may be just sufficient to bring the surface of the substrate (22) into intimate contact with the surface of the ink imaged layer (18).

Figure 3B:
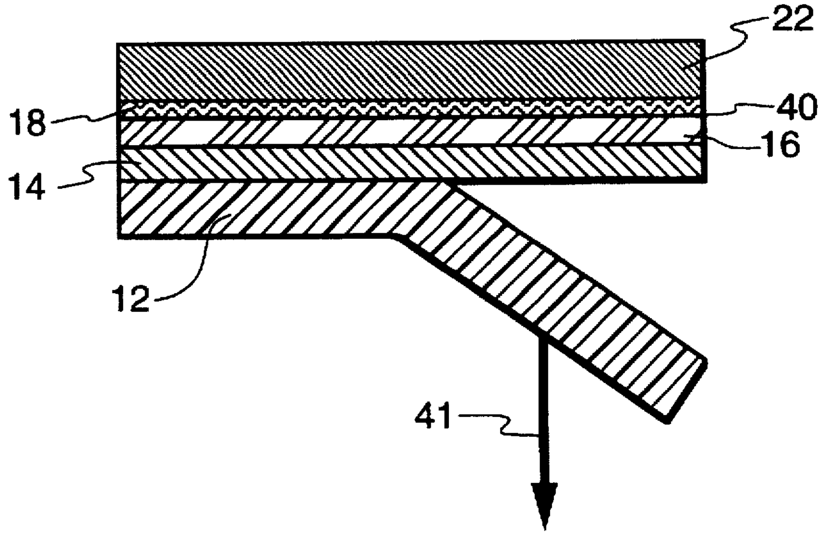

The third process step (C) comprises removing the temporary carrier layer (12) from the surface of the protective layer (14) of the imaged laminate (30). Referring to FIG. 3*b*, the temporary carrier layer (12) is peeled, using a peel force (41), from the surface of the protective layer (14) to form the completed protected ink image element (40). Typically, the temporary carrier layer (12) is peeled with a peel force (41) directed at an angle of 90° or more from the surface of the protective layer (14). The peel rate and the peel force (41) are not critical and preferred values will depend on the nature of the protective and carrier materials. The temperature at which the temporary carrier layer (12) is peeled form the protective layer (14) will depend on the nature of the substrate, adhesive, protective and carrier materials used in the imaged laminate (30). The temporary carrier layer (12) may be peeled at room temperature or, alternatively, the imaged laminate (30) may be heated to facilitate removal of the temporary carrier layer (12). When a thermally activated adhesive material is used to form the imaged laminate (30), it surprisingly has been found that the temporary carrier layer (12) can be removed immediately after formation of the imaged laminate (30) (i.e., while still in a heated state from the application process step (B)) without delamination of the adhered ink image layer (18) or any of the other component layers. In this context, the term "immediately" is intended to mean a time span of about 1 minute or less and preferably between about 1 second and about 20 seconds. Alternatively, when a thermally activated adhesive material is used to form the imaged laminate (30), the laminate may be cooled and stored before removal of the temporary carrier layer (12). In this instance, the temporary carrier layer (12) can be removed at room temperature from the imaged laminate (30) without delamination of the adhered ink image layer (18) or any of the other component layers. Alternatively, the imaged laminate (30) may be reheated prior to removal of the temporary carrier layer (12). In this instance, the laminate typically is reheated to a temperature which is within about ±5° C. of the temperature used to form the element in process step (B). To further protect the imaged laminate (30) from damage before its use, the temporary carrier layer (12) may be kept adhered to the imaged laminate (30) during its intermediate storage and handling, and then removed just prior to use.

In the added embodiment of this invention, the substrate (20) further comprises an adhesive layer adhered to a surface of the substrate (22); and optionally, a removable cover sheet temporarily adhered to the adhesive layer. In this embodiment, the process further comprises; either before or after step (C), the added step (D) of removing the removable cover sheet, if present, from the adhesive layer and adhering the adhesive layer of the protected ink image element (40) to a second substrate to form a mounted, imaged laminate. This embodiment is particularly useful for preparing component protected image "tiles" and then mounting each tile to form a composite display image such as on a billboard or the like. In this instance, depending on the end use, the mounting adhesive may be either permanent or temporary.

Another embodiment of this invention, comprises an added step wherein after step (C), the image transparent, protective layer along with the image transparent, adhesive, ink receptive layer and the ink imaged layer are removed intact from the substrate. In addition, after the image transparent, protective layer along with the image transparent, adhesive, ink receptive layer and the ink imaged layer are removed from the substrate, they may be reapplied to the same substrate or to a second substrate. These added steps allow for the complete removal of the adhered layers after a period of use, e.g., removal of a promotional display from a window. Alternatively, the adhered layers may be partially or totally removed, realigned, and then reapplied to the substrate or another substrate, e.g., for display in another window.

The ink imaging process of this invention will now be illustrated by the following examples but is not intended to be limited thereby.

EXAMPLE 1

An ink receptor element was prepared as follows: An abrasion resistant coating solution was prepared from the following ingredients.

| Ingredient | Parts By Weight |
|---|---|
| NeoRez ® R-9679[(1)] polyurethane | 90.0 |
| Tinuvin ® 1130[(2)] UV absorber | 5.0 |
| Ethanol | 5.0 |

(1)NeoRez ® R-9679 is an aliphatic aqueous colloidal dispersion of a urethane polymer containing 37% by weight solids (specific gravity of solids is 1.16 and acid number of resin solids is 17.0), and is a product of Zeneca Resins, Inc., Wilmington, Massachusettes.
(2)Tinuvin ® 1130 UV absorber, a product of Ciba-Geigy, is the reaction product of polyethylene glycol 300 and the methyl ester of beta-(3-(2h-benzotriazole-2-yl)-4-hydroxy-5-tert-butylphenyl)propionic acid.

The Tinuvin® 1130 was dissolved in the ethanol to form a 50% by weight solution. The Tinuvin® solution was stirred into the NeoRez® R-9679 aqueous dispersion in a Lightnin® mixer at slow speed and mixed for ten minutes. The resulting dispersion was then coated on a 0.10 mm (~0.004 inch) thick, untreated, polyethylene terephthlate film (the temporary carrier layer) using a #16 meyer rod and dried at 240° F. (115° C.) for two minutes to form the image transparent, protective layer having a dry coating thickness of 3.6 μm. The Tinuvin® 1130 UV absorber in the protective layer blocks about 90% of the incident UV radiation having a wavelength between 310 and 380 nm. An adhesive, ink receptive coating solution was prepared from the following ingredients:

| Ingredient | Parts By Weight |
|---|---|
| Ethanol | 30.841 |
| Deionized water | 20.746 |
| Joncryl ® 61LV(3) acrylic resin | 7.736 |
| 2-Pyrrolidone methenyl homopolymer(4) | 5.844 |
| Glycerine | 1.434 |
| Amorphous silica (ave. particle size 15 μm)(5) | 0.044 |
| Zonyl ® FSJ(6) fluorosurfactant | 0.015 |
| Rovace ® HP-2931(7) vinyl acetate/acrylic copolymer | 33.340 |

(3)Joncryl ® 61LV acrylic resin solution is, by weight, 35% Joncryl ® 678 acrylic resin, 51% water, 5% isopropanol, 1.5% ethylene glycol, and 7.5% Ammonia (28%); the resin has an acid number of 70 and a Tg of 95° C.; and is a product of S.C. Johnson & Son, Inc., Racine, Wisconsin.
(4)PVP K-90 is polyvinylpyrrolidone which has a viscosity average molecular weight of 700,000 and is a product of GAF Chemicals Corporation, Wayne, New Jersey.
(5)Amorphous silica is Syloid ® 620 and is a product of Davison Chemcial Division of W.R. Grace & Co., Baltimore, Maryland.
(6)Zonyl ® FSJ is an anionic fluorosurfactant and is a product of E.I. du Pont de Nemours & Co., Wilmington Delaware.
(7)Rovace ® HP-2931 is a vinyl acetate/acrylic copolymer aqueous emulsion containing 50% solids, and is a product of Rohm & Haas Company, Philadelphia, Pennsylvania.

The above ingredients were added in the order shown and mixed in a Lightnin® mixer at medium speed until all ingredients were fully incorporated (about 1 hour). The solution was overcoated onto the previously coated protective layer using a #38 meyer rod and dried at 240° F. (~115° C.) for two minutes to give a dry coating thickness of 9.1 μm to form the image transparent, adhesive, ink receptive layer of the ink receptor element.

The substrates used to demonstrate the process of this invention were; a sheet of 0.0055 inch (~0.14 mm) thick cling vinyl coated with an ink receptive layer and backed with a 10 pt. paper liner (Flexmark® CV600 W, manufactured by Flexcon Co., Inc.); an adhesively backed sheet of 0.004 inch (~0.1 mm) thick untreated cast vinyl polymer having a removable release liner; a sheet of Rexcal® 4000-000 white cast vinyl sheet (a product of Rexham Branded Products, Lancaster, S.C.); a sheet of TYPAR® spunbonded polypropylene fabric with an acrylic primed surface (a product of Eastern Banner Supply, Moorsesville, Ind.; a corrugated cardboard paper product; and an unfinished hardwood plank.

For each substrate, an 8.5 inch×11 inch (21.6 cm×27.9 cm) sheet was cut from the ink receptor element prepared supra. A four color image was printed on the ink receptive layer of each sheet using an IBM Lexmark® ink jet printer using the manufacturer's recommended inks and printing conditions. RH was maintained between 50% and 70%, and temperature was maintained between 65° F. (~18.3° C.) and 75° F. (~23.8° C.)

The laminating step was performed by first laying each substrate in such a way that the substrate surface and the ink imaged layer of each imaged receptor element were contacting each other. Each composite was then passed through the hot nip of an IT 6000 hot roll laminator at a speed of 2 feet/minute (~1.02 cm/second), at a temperature of 250° F. (~121° C.) and at a pressure of 100 psi (~7.0 kg/cm$^2$). After each laminated element exited from the hot nip, it was held for 30 seconds and then the polyethylene terephthlate, temporary carrier layer contiguous to the protective layer was stripped therefrom to form a protected ink image on each of the three substrates. The surface of each protected ink image produced could withstand scribing with a 4H pencil with no removal of the protective layer or image.

The protected ink image on the static cling vinyl can be used as a removable decal on a substrate, e.g., a window. The protected ink image on the adhesive backed vinyl can be mounted by the adhesive backing to the surface of a substrate to form a mounted protected image, e.g., a poster, billboard, sign, and the like. The protected ink image on the cast white vinyl sheet can be used as a back lighted display. The protected ink image on the spunbonded polypropylene fabric can be used as a banner. The protected ink image on the corrugated cardboard can be used in product packaging. The protected ink image on the untreated hardwood can be used as a decorative decal on furniture or buildings.

EXAMPLE 2

An ink receptor element was prepared as follows: An abrasion resistant coating solution was prepared and coated on a 0.10 mm (~0.004 inch) thick, untreated, polyethylene terephthlate film as described in Example 1. An ink receptive coating solution was prepared from the following ingredients:

| Ingredient | Parts By Weight |
|---|---|
| Ethanol | 46.242 |
| Deionized water | 31.136 |
| Joncryl ® 61LV(3) acrylic resin | 11.610 |
| Polyvinylpyrrolidone(4) | 8.770 |
| Amorphous silica (ave. particle size 15 μm)(5) | 0.067 |
| Zonyl ® FSJ(6) fluorosurfactant | 0.023 |

The above ingredients were added in the order shown and mixed in a Lightnin® mixer at medium speed until all ingredients were fully incorporated (about 1 hour). The solution was overcoated onto the previously coated protective layer using a #38 meyer rod and dried at 240° F. (~115° C.) for two minutes to give a dry coating thickness of 8.1 μm to form the image transparent, ink receptive layer of the ink receptor element.

An adhesive layer coating solution was prepared from the following ingredients.

| Ingredient | Parts By Weight |
|---|---|
| Toluene | 81.0 |
| Propylene glycol monomethyl ether | 5.0 |
| Tone ® P767-E Polycaprolactone(8) | 10.00 |
| Amorphous silica (ave. particle size 3 μm) | 4.00 |

(8)Tone ® P767-E plastic resin is polycaprolactone and is a product of Union Carbide.

The coating solution was made by mixing the ingredients in the order shown with a high speed Lightnin® mixer and stirred for 1 hour. The solution was overcoated onto the previously coated protective layer using a meyer rod and dried at 240° F. (~115° C.) for one minute to form the image transparent, adhesive layer of the ink receptor element.

An 8.5 inch×11 inch (21.6 cm×27.9 cm) sheet was cut from the ink receptor element prepared supra. A color image was printed on the ink receptive layer of the sheet using an Hewlett-Packard Deskjet® 500C color printer using the manufacturer's recommended inks and printing conditions.

The laminating step was performed by first laying a sheet of an adhesively backed sheet of 0.004 inch (~0.1 mm) thick untreated cast vinyl polymer having a removable release liner in such a way that the vinyl polymer surface and the ink imaged layer of the imaged receptor element were contacting each other. The composite was then passed through the hot nip of an IT 6000 hot roll laminator at a speed of 2 feet/minute (~1.02 cm/second), at a temperature of 250° F. (~121° C.) and at a pressure of 100 psi (~7.0 kg/cm$^2$). Immediately after exiting the nip rolls, the polyethylene terephthlate, temporary carrier layer contiguous to the protective layer was stripped therefrom to form a protected ink image on the vinyl polymer substrate.

Those skilled in the art having the benefit of the teachings of the present invention as hereinabove set forth, can effect numerous modifications thereto. These modifications are to be construed as being encompassed within the scope of the present invention as set forth in the appended claims.

What is claimed is:

1. A process for preparing a protected ink image comprising

A) imagewise depositing from an ink of an ink jet, one or more ink images on an ink receptor, the ink comprising a carrier liquid which is water or a polyhydric alcohol or a combination thereof, and the ink receptor comprising
   1) a temporary carrier layer;
   2) an image transparent, protective layer; and
   3) an image transparent, adhesive, ink receptive layer permanently adhered to the image transparent, protective layer;

wherein, the one or more ink images are deposited on the image transparent, adhesive, ink receptive layer to form an ink imaged layer of an imaged receptor;

B) applying to the ink imaged layer of the imaged receptor, a substrate; wherein, the adhesive of the image transparent, adhesive, ink receptive layer is activated whereby the substrate is adhered to the ink imaged layer of the imaged receptor to form an imaged laminate; and C) removing the temporary carrier layer from the image transparent, protective layer of the imaged laminate.

2. The process of claim 1 wherein at least one of the one or more ink images, is imagewise deposited from an aqueous ink jet ink.

3. The process of claim 1 wherein the substrate is applied to the ink imaged layer under an applied pressure whereby the substrate is permanently adhered to the ink imaged layer of the imaged receptor.

4. The process of claim 1 wherein the substrate is applied to the ink imaged layer under an applied pressure of atmospheric pressure or greater.

5. The process of claim 1 wherein the substrate is applied to the ink imaged layer at a temperature of about 80° C. or greater.

6. The process of claim 5 wherein the substrate is applied to the ink imaged layer at a temperature between about 100° C. and about 200° C.

7. The process of claim 1 wherein the substrate is applied to the ink imaged layer under heat and an applied pressure to form the imaged laminate.

8. The process of claim 7 wherein at least the imaged receptor or the substrate is heated to a temperature of about 80° C. or greater.

9. The process of claim 7 wherein the substrate is pressure laminated to the imaged receptor under an applied pressure of atmospheric pressure or greater.

10. The process of claim 1 wherein the temporary carrier layer is removed from the imaged laminate when the imaged laminate is at a temperature of about 80° C. or greater.

11. The process of claim 1 wherein the temporary carrier layer is a flexible web or sheet material.

12. The process of claim 11 wherein the flexible web or sheet material is a polymeric film or a foraminous material.

13. The process of claim 11 wherein the flexible web or sheet material is surface treated with a release agent.

14. The process of claim 1 wherein the image transparent, protective layer comprises a polymeric film material.

15. The process of claim 14 wherein the polymeric film material is taken from the group consisting of polyvinyl chloride; polyvinylidene chloride; fluorinated polymers and copolymers; polyvinyl butyral; cellulose acetate proprionate; cellulose acetate butyrate; polyesters; acrylics; fluorinated polymers; polyurethanes; styrene copolymers; styrene/acrylonitrile copolymers; and combinations thereof.

16. The process of claim 1 wherein the image transparent, protective layer is visually transparent in at least one region within the visible spectral region.

17. The process of claim 1 wherein the image transparent, protective layer has a thickness in the range of about 0.5 μm to about 10 μm.

18. The process of claim 1 wherein the image transparent, protective layer will withstand scribing with the point of a 4H pencil without breakthrough.

19. The process of claim 1 wherein the image transparent, adhesive, ink receptive layer comprises a hydrophilic resin material and an adhesive material.

20. The process of claim 19 wherein the hydrophilic resin material comprises a water soluble resin.

21. The process of claim 20 wherein the water soluble resin is polyvinyl pyrrolidone; substituted polyvinyl pyrrolidone; polyvinyl alcohol; substituted polyvinyl alcohol; vinyl pyrrolidone/vinyl acetate copolymer; vinyl acetate/acrylic copolymer; polyacrylic acid; polyacrylamides; hydroxyethylcellulose; carboxyethylcellulose; gelatin; or polysaccharides; or mixtures thereof.

22. The process of claim 20 wherein the hydrophilic resin material further comprises a water insoluble resin.

23. The process of claim 22 wherein the water insoluble resin is a styrenated acrylic copolymer; styrene/allyl alcohol copolymer; nitrocellulose; carboxylated resin; polyester resin; polyurethane resin; polyketone resin; or polyvinyl butyral resin; or mixtures thereof.

24. The process of claim 19 wherein the adhesive material comprises a thermally activated adhesive material.

25. The process of claim 24 wherein the thermally activated adhesive material is a thermoplastic polyurethane, polycaprolactone, acrylic copolymer, or a vinyl acetate/acrylic copolymer, or combinations thereof.

26. The process of claim 25 wherein the adhesive material comprises a vinyl acetate/acrylic copolymer.

27. The process of claim 19 wherein the adhesive material comprises a pressure sensitive adhesive material.

28. The process of claim 19 wherein the adhesive material comprises a contact adhesive material.

29. The process of claim 19 wherein the image transparent, adhesive, ink receptive layer contains a dye mordant, a surfactant, particulate materials, a colorant, an ultraviolet absorbing material, an organic acid, an optical brightener, or mixtures thereof.

30. The process of claim 1 wherein the substrate is a material taken from the group consisting of wood; metal; ceramic; paper; corrugated paper products; plastics; natural and synthetic fibre fabrics; glasses; leathers; and composites thereof.

31. The process of claim 1 wherein the substrate is a flexible web or sheet material.

32. The process of claim 31 wherein the flexible web or sheet material is a polymeric film or a foraminous material.

33. The process of claim 1 wherein the substrate further comprises a) an adhesive layer adhered to a surface of the substrate;

wherein, either before or after step (C),

D) the adhesive layer of the imaged laminate is adhered to a second substrate to form a mounted, imaged laminate.

34. The process of claim 1 wherein after step (C), the image transparent, protective layer along with the image transparent, adhesive, ink receptive layer and the ink imaged layer are removed intact from the substrate.

35. The process of claim 34 wherein after the image transparent, protective layer along with the image transparent, adhesive, ink receptive layer and the ink imaged layer are removed from the substrate, they are reapplied to the substrate or to a second substrate.

36. The process of claim 1 wherein the image transparent, adhesive, ink receptive layer is a blend of materials in a single layer.

37. The process of claim 1 wherein the image transparent, adhesive, ink receptive layer is a composite of two or more individual layers.

38. The process of claim 37 wherein the composite comprises a laminate of an individual adhesive layer and an individual ink receptive layer.

39. The process of claim 38 wherein the individual adhesive layer comprises a polycaprolactone material.

40. The process of claim 1 wherein the substrate further comprises a) an adhesive layer adhered to a surface of the substrate; and b) a removable cover sheet temporarily adhered to the adhesive layer;

wherein, either before or after step (C),

D) the removable cover sheet is removed from the adhesive layer and the adhesive layer of the imaged laminate is adhered to a second substrate to form a mounted, imaged laminate.

* * * * *